United States Patent
Shinohara et al.

(10) Patent No.: US 10,436,128 B2
(45) Date of Patent: Oct. 8, 2019

(54) VEHICLE CONTROL SYSTEM

(71) Applicant: TOYOTA JIDOSHA KABUSHIKI KAISHA, Toyota-shi, Aichi-ken (JP)

(72) Inventors: Masanori Shinohara, Susono (JP); Kohei Tochigi, Susono (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 375 days.

(21) Appl. No.: 15/173,940

(22) Filed: Jun. 6, 2016

(65) Prior Publication Data
US 2016/0363060 A1   Dec. 15, 2016

(30) Foreign Application Priority Data

Jun. 11, 2015   (JP) .................... 2015-118192

(51) Int. Cl.
*F02D 29/02*   (2006.01)
*F02N 11/08*   (2006.01)

(52) U.S. Cl.
CPC ............ *F02D 29/02* (2013.01); *F02N 11/084* (2013.01); *F02N 2200/061* (2013.01); *F02N 2200/0806* (2013.01); *Y02T 10/48* (2013.01)

(58) Field of Classification Search
CPC ................................ F02D 29/02; F02N 11/084
See application file for complete search history.

(56) References Cited

U.S. PATENT DOCUMENTS

| | | | | |
|---|---|---|---|---|
| 5,595,064 A | * | 1/1997 | Ikeda ............... | B60H 1/00392 180/65.1 |
| 2002/0017261 A1 | * | 2/2002 | Kuroda ............ | F02N 11/0825 123/179.4 |
| 2004/0055305 A1 | * | 3/2004 | Kuroda ............ | B60H 1/00735 60/698 |
| 2005/0044873 A1 | * | 3/2005 | Tamai ............... | B60H 1/004 62/323.1 |
| 2007/0265762 A1 | * | 11/2007 | Suzuki ............. | B60H 1/004 701/102 |
| 2010/0145562 A1 | * | 6/2010 | Moran .............. | B60K 6/46 701/22 |
| 2012/0130597 A1 | * | 5/2012 | Aoyagi ............ | B60W 10/06 701/48 |

(Continued)

FOREIGN PATENT DOCUMENTS

JP        2013-255365 A    12/2013

*Primary Examiner* — Abby Y Lin
*Assistant Examiner* — Donald J Wallace
(74) *Attorney, Agent, or Firm* — Sughrue Mion, PLLC

(57) ABSTRACT

A control system of a vehicle includes: an engine; a plurality of accessories including an air conditioner; a battery; a generator; and an ECU configured to automatically stop the engine, control the generator to charge or discharge the battery, inhibit the engine from being automatically stopped, calculate a first stop time as a length of time for which the engine can be automatically stopped, during operation of the air conditioner, calculate a first electric quantity as an estimated quantity of electricity consumed, calculate a second stop time as a length of time for which the vehicle is predicted to be stopped in the future, calculate a second electric quantity as an estimated quantity of electricity consumed, and determine the SOC target value, based on the first electric quantity and the second electric quantity.

9 Claims, 8 Drawing Sheets

(56) References Cited

U.S. PATENT DOCUMENTS

| | | | |
|---|---|---|---|
| 2013/0317728 A1* | 11/2013 | Hall | B60H 1/00778 |
| | | | 701/113 |
| 2013/0332016 A1 | 12/2013 | Suzuki et al. | |
| 2014/0257636 A1* | 9/2014 | Ueki | F02D 29/02 |
| | | | 701/36 |
| 2014/0330473 A1* | 11/2014 | Miyashita | B60L 7/10 |
| | | | 701/22 |
| 2015/0191164 A1* | 7/2015 | Kinomura | B60W 10/06 |
| | | | 701/22 |
| 2015/0291051 A1* | 10/2015 | Morimoto | B60L 11/1862 |
| | | | 307/10.1 |
| 2016/0325729 A1* | 11/2016 | Askerdal | B60W 20/15 |

* cited by examiner

| 20 sec | 0 sec | 60 sec | 10 sec | 0 sec | | | | | |
|---|---|---|---|---|---|---|---|---|---|

| 20 sec | 0 sec | 60 sec | 10 sec | 0 sec | 0 sec | 0 sec | 0 sec | 10 sec | 40 sec |
|---|---|---|---|---|---|---|---|---|---| pt: 0 sec

| NEAR-PAST STOP TIME RATE R1 | 0% | - | 25% | - | ≥ 50% |
|---|---|---|---|---|---|
| NEAR-PAST STOP TIME COEFFICIENT Tr1 | 60sec | - | 90sec | - | 180sec |
| REMOTE-PAST STOP TIME RATE R2 | 0% | - | 25% | - | ≥ 40% |
| REMOTE-PAST STOP TIME COEFFICIENT Tr2 | 60sec | - | 90sec | - | 180sec |

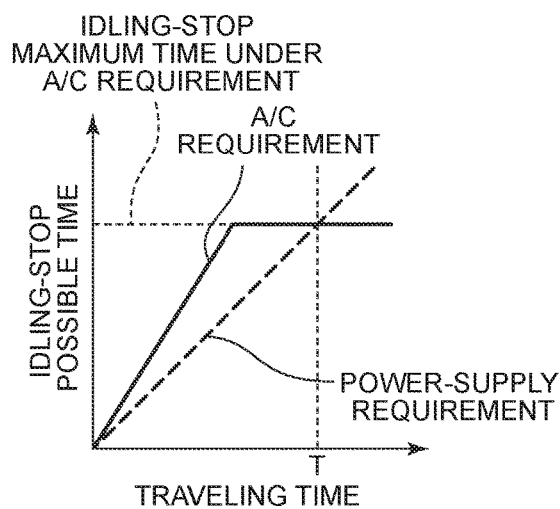
FIG. 10A
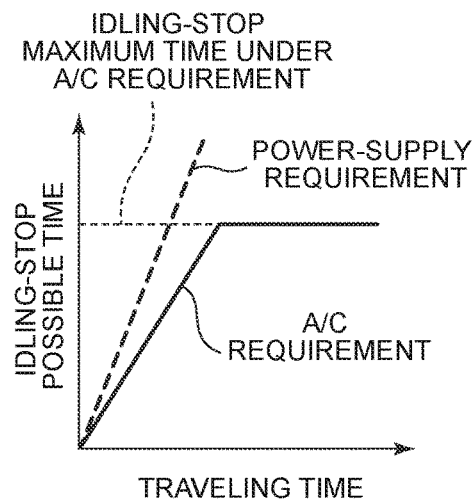
FIG. 10B
FIG. 11A
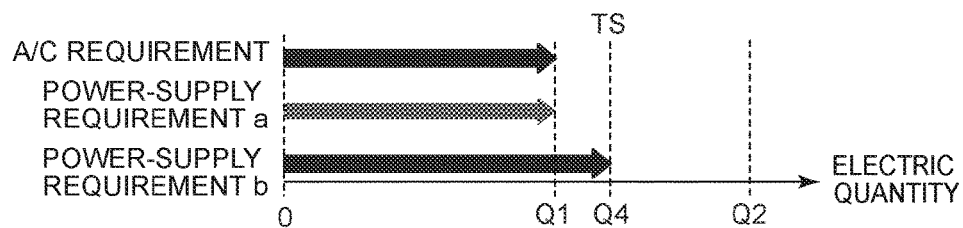
FIG. 11B
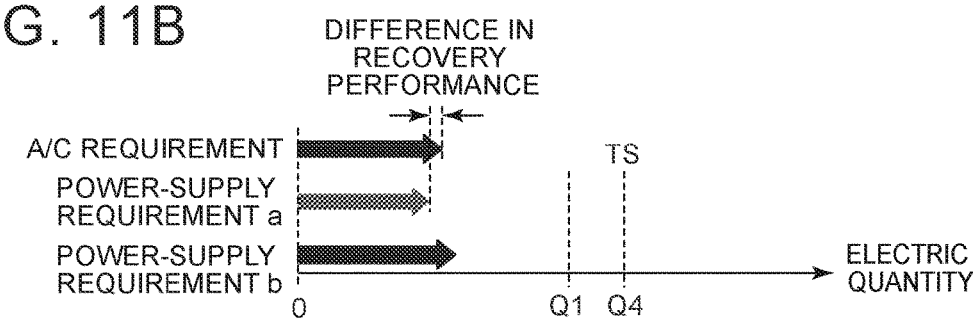
FIG. 11C
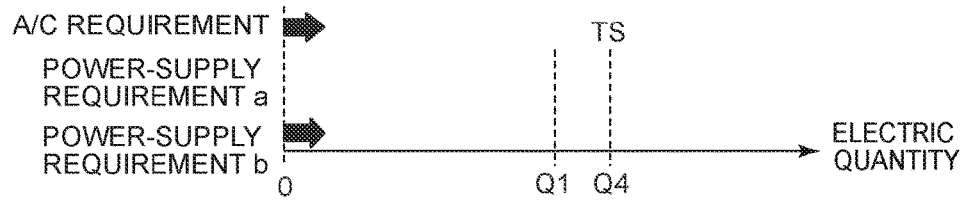

VEHICLE CONTROL SYSTEM

INCORPORATION BY REFERENCE

The disclosure of Japanese Patent Application No. 2015-118192 filed on Jun. 11, 2015 including the specification, drawings and abstract is incorporated herein by reference in its entirety.

BACKGROUND OF THE INVENTION

1. Field of the Invention

The invention relates to a vehicle control system of a vehicle, such as an automobile, and particularly relates to a technical field of the vehicle control system that performs control of SOC (State of Charge) of a battery installed on the vehicle.

2. Description of Related Art

One example of this type of system has been proposed which drives a motor for generating electric power by driving an engine while keeping its output at a preset level, so as to charge a battery for driving the vehicle, when the amount of charge of the battery for driving the vehicle is equal to or smaller than a preset threshold value, and the vehicle is stopped. Further, when there is a request for operation of an air-conditioning unit of the vehicle, the system operates the air conditioner by driving the engine while keeping its output at a preset level, so as to prevent the traveling range or distance from being reduced due to reduction of the amount of charge of the battery for the vehicle (see Japanese Patent Application Publication No. 2013-255365 (JP 2013-255365 A)).

In the meantime, idling stop for stopping the engine when the vehicle is temporarily stopped is often carried out, in order to improve the fuel economy performance of the vehicle. When the idling stop is performed, a target value associated with SOC control of the battery is often set so that the SOC will be large enough to cover an estimated quantity of electricity to be consumed, which corresponds to a predicted stop time, for example.

Meanwhile, if an air conditioner (which will be referred to as "A/C" when appropriate) is activated, the engine is restarted even during idling stop (namely, the idling stop is cancelled), so as to drive a compressor, for example.

Therefore, if the target value associated with the SOC control is set according to the predicted vehicle stop time, for example, the amount of charge of the battery may become excessively large, and the fuel economy performance may not be sufficiently improved.

SUMMARY OF THE INVENTION

The invention provides a vehicle control system that improves the fuel economy performance.

A control system according to an aspect of the invention is a control system of a vehicle, the vehicle including an engine, a plurality of accessories including an air conditioner, a battery supplying electric power to each of the plurality of accessories, and a generator generating electric power and charging the battery with at least some of the electric power. The control system is configured to automatically stop the engine, control the generator to charge or discharge the battery, so as to make an SOC of the battery close to an SOC target value, and inhibit the engine from being automatically stopped when the SOC of the battery is equal to or smaller than an SOC threshold value. The control system includes: first calculating porthion configured to calculate a first stop time as a length of time for which the engine can be automatically stopped, during operation of the air conditioner, based on an outside air temperature, or a temperature difference between the outside air temperature and a set temperature of the air conditioner, and calculate a first electric quantity as an estimated quantity of electricity consumed, which quantity is determined by a product of the first stop time, and a total load of a set of operating accessories that are currently in operation, out of the plurality of accessories; second calculating portion configured to calculate a second stop time as a length of time for which the vehicle is predicted to be stopped in the future, from a traveling history of the vehicle, and calculate a second electric quantity as an estimated quantity of electricity consumed, which quantity is determined by a product of the second stop time and the total load of the set of operating accessories; and setting portion configured to set the SOC target value to a third SOC value that is equal to or larger than a first SOC value that is larger than the SOC threshold value by an SOC value corresponding to the first electric quantity, and is smaller than a second SOC value that is larger than the SOC threshold value by an SOC value corresponding to the second electric quantity, when the first electric quantity is smaller than the second electric quantity.

According to the aspect described above, the setting portion may be configured to set the SOC target value to a third SOC value when the first electric quantity is smaller than the second electric quantity, the third SOC value being equal to or larger than a first SOC value, and being smaller than a second SOC value, the first SOC value being larger than the SOC threshold value by an SOC value corresponding to the first electric quantity, the second SOC value being larger than the SOC threshold value by an SOC value corresponding to the second electric quantity.

The "SOC target value" may be a target value of feedback control associated with the SOC of the battery, which control is performed during constant-speed traveling of the vehicle. Namely, when the feedback control is performed on the SOC of the battery, charge/discharge of the battery may be controlled so that the SOC of the battery becomes close to the SOC target value, or is kept at the SOC target value.

While various known methods may be employed for the feedback control on the SOC of the battery, a method of controlling charge/discharge of the battery by controlling the voltage of electric power generated by a generator, for example, may be used for the feedback control. More specifically, the battery can be charged if the voltage of the power generated by the generator is increased to be higher than a voltage of an open circuit of the battery, and the battery can be discharged if the voltage of the power generated by the generator is reduced to be lower than the voltage of the open circuit of the battery.

Accordingly, if the SOC of the battery is higher than the SOC target value when the SOC of the battery is compared with the SOC target value, the voltage of the electric power generated by the generator is made lower than the voltage of the open circuit of the battery, so that the battery is discharged, and the SOC of the battery is made close to the SOC target value. If the SOC of the battery is lower than the SOC target value, the voltage of the power generated by the generator is made higher than the voltage of the open circuit of the battery, so that the battery is charged, and the SOC of the battery can be made close to the SOC target value.

The statement that "the voltage of the power generated is controlled so as to charge or discharge the battery" may mean that the voltage of the electric power generated by the generator is made higher or lower than the voltage of the open circuit of the battery, for example, so that the battery is charged or discharged.

The "SOC threshold value" is a value based on which it is determined whether to inhibit automatic stop of the engine, and may be set as a fixed value in advance, or as a variable value that varies according to some physical quantity (quantities) or parameter(s). While various known methods may be employed as a method of setting the SOC threshold value, the SOC threshold value may be set such that the SOC of the battery does not fall below the lower-limit value of the operational SOC range (i.e., SOC range in which the battery can be used while meeting a requirement for a long product life of the battery, for example), due to the automatic stopping function of the engine, for example.

The "during operation of the air conditioner" is not limited to the time when the compressor that constitutes the air conditioner is in operation, but may mean a condition where a switch that switches the air conditioner between the ON state and the OFF state is ON. Various known methods may be employed as methods of detecting the outside air temperature and the temperature difference between the outside air temperature and the set temperature of the air conditioner; therefore, details of these methods will not be described herein.

The first stop time may be calculated based on a relational expression, a map, or the like, which indicates the relationship between the outside temperature or the temperature difference, and the time for which the engine can be automatically stopped. The relational expression or map as described above may be constructed experimentally or by simulation, in view of the performance of the air conditioner, a degree of change of the air-conditioner outlet air temperature due to the outside air temperature or the temperature difference, a degree of discomfort felt by the driver, etc., due to change of the vehicle-interior temperature caused by the outside temperature or the temperature difference, and so forth.

More specifically, the first stop time may be the longest time when the outside air temperature is a temperature at or around which one feels comfortable (e.g., around 20° C.). As the outside air temperature becomes higher than the temperature at or around which one feels comfortable, the first stop time may be shortened, so as to meet a request for comfort provided by cooling, for example. As the outside air temperature becomes lower than the temperature at or around which one feels comfortable, the first stop time may be shortened, so as to meet a request to prevent windows from being fogged up or prevent dew condensation, for example. Also, as the temperature difference between the outside air temperature and the set temperature of the air conditioner becomes larger, the first stop time may be shortened, so as to meet a request for comfort provided by cooling, prevention of fogging of windows, or prevention of dew condensation, for example.

The first electric quantity may mean a quantity of electricity that is presumed to be consumed by the currently operating accessories, during the first stop time.

The second electric quantity may mean a quantity of electricity that is presumed to be consumed by the currently operating accessories, during the second stop time.

During operation of the air conditioner, the compressor needs to be operated by the power of the engine. However, since increase of the in-vehicle temperature can be suppressed by cool air stored in an evaporator that constitutes the air conditioner, the compressor can be stopped if temporarily (namely, idling stop is possible).

Here, the statement that "when the first electric quantity is smaller than the second electric quantity" may mean that the length of time for which the compressor can be stopped is shorter than the second stop time (namely, the time for which the vehicle will be stopped in the future) calculated from the traveling history of the vehicle. In this case, the engine is restarted so as to operate the compressor during stopping of the vehicle; therefore, if the second electric quantity based on the second stop time is secured for idling stop, the battery will be charged more than necessary.

According to the above aspect of the invention, it is possible to secure the estimated quantity of electricity consumed (i.e., the first electric quantity) of the time for which at least the compressor can be stopped (namely, the first stop time), and also prevent the battery from being charged more than necessary. As a result, the fuel economy performance can be improved.

In the control system according to the above aspect, the setting means may set, when the first electric quantity is smaller than the second electric quantity, and an expected traveling time of the vehicle corresponding to the second stop time is shorter than a time threshold value, the SOC target value to a fourth SOC value that is smaller than the second SOC value, and is larger than the third SOC value.

The "expected traveling time" may be obtained as a length of time other than the second stop time, within a predetermined period used for calculating the second stop time from the traveling history, for example.

The fourth SOC value may be a value obtained by adding a margin that is set in view of the case where idling stop control is executed several times in a relatively short period, to the third SOC value, for example.

During traveling of the vehicle (i.e., during operation of the engine), the generator generates electric power, using the power of the engine, for example, so that the battery is charged.

If the traveling time is relatively long, and the SOC of the battery is sufficiently recovered, the time for which idling stop control can be performed is equal to the first stop time obtained from the outside air temperature or the temperature difference, or the second stop time obtained from the traveling history.

However, in a situation where the vehicle stops relatively frequently, as in an urban area, for example, the period (i.e., the traveling time) between the time when idling stop control was executed to the time when idling stop is executed next time is relatively short, and the SOC of the battery may not be sufficiently recovered. Namely, the maximum time for which the engine can be stopped under idling stop control depends on the current SOC of the battery.

Also, during traveling of the vehicle, the compressor is operated using the power of the engine, so that cool air is stored in the evaporator of the air conditioner. If the traveling time is relatively short, cool air may not be sufficiently stored in the evaporator. In this case, the time for which the compressor can be stopped (i.e., the time for which the engine can be stopped) does not depend on the first stop time obtained from the outside air temperature or the temperature difference, but depends on the current cool storage status of the evaporator. This is because, if the air-conditioner outlet air temperature that depends on the cool storage status of the evaporator exceeds a permissible temperature, it may impair passenger comfort in the vehicle interior.

In this connection, the amount of charge of the battery largely depends on traveling conditions (such as acceleration, deceleration, uphill, downhill, etc.) of the vehicle, whereas the cool storage status of the evaporator hardly depends on the traveling conditions of the vehicle. Namely, the SOC recovery performance of the battery is different from the cool-storage recovery performance of the evaporator.

When the cool-storage recovery performance of the evaporator exceeds the SOC recovery performance of the battery, a situation where the compressor can be stopped, but the engine must be restarted or cannot be stopped may take place because of the battery. Then, the amount of fuel consumption corresponding to the time for which the compressor can be stopped may not be reduced.

In the meantime, there is an upper limit corresponding to the cool storage performance of the evaporator, to the time for which the compressor can be stopped according to the cool storage status of the evaporator (i.e., the time for which the engine can be stopped) (this upper limit corresponds to the first stop time, for example). Therefore, if the traveling time is relatively long, the time for which the engine can be stopped according to the current SOC of the battery will be longer than the time for which the compressor can be stopped according to the cool storage status of the evaporator, even in the case where the cool-storage recovery performance of the evaporator exceeds the SOC recovery performance of the battery.

Thus, according to the above aspect of the invention, when the cool-storage recovery performance of the evaporator exceeds the SOC recovery performance of the battery, the setting means sets a length of time that coincides with the time for which the compressor can be stopped according to the cool storage status of the evaporator, and the time for which the engine can be stopped according to the SOC of the battery, or a length of time that is longer by a given time than the above-indicated length of time, as "time threshold value". The "time threshold value" may be sequentially changed, typically depending on traveling conditions of the vehicle, state of charge of the battery, and so forth.

According to the above aspect of the invention, the first stop time may be a length of time for which a compressor of the air conditioner can be stopped.

According to the above aspect of the invention, the set of operating accessories may include the air conditioner as an operating accessory;
  the second calculating portion may be configured to calculate a third electric quantity as an estimated quantity of electricity consumed, which quantity is determined by a product of a load obtained by subtracting a load of the air conditioner from the total load of the set of operating accessories, and the second stop time; and
  the setting portion may be configured to
    set the SOC target value to a fifth SOC value that is larger than the SOC threshold value by an SOC value corresponding to the third electric quantity when the first electric quantity is smaller than the third electric quantity, and set the SOC target value to the first SOC value when the first electric quantity is equal to or larger than the third electric quantity.

According to the above aspect of the invention, even when the vehicle stops relatively frequently, the idling stop control is less likely to be inhibited due to insufficient SOC of the battery.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3A is a conceptual diagram showing the concept of calculation of a near-past stop time rate according to the first embodiment of the invention;

FIG. 3B is a conceptual diagram showing the concept of calculation of the near-past stop time rate according to the first embodiment of the invention;

FIG. 10A is a conceptual diagram showing the concept of the recovery performance during traveling of the vehicle;

FIG. 10B is a conceptual diagram showing the concept of the recovery performance during traveling of the vehicle;

FIG. 11A is a view showing another example of comparison between an electric quantity of a power-supply requirement and an electric quantity of an A/C requirement;

FIG. 11B is a view showing another example of comparison between the electric quantity of the power-supply requirement and the electric quantity of the A/C requirement;

FIG. 11C is a view showing another example of comparison between the electric quantity of the power-supply requirement and the electric quantity of the A/C requirement.

DETAILED DESCRIPTION OF EMBODIMENTS

Vehicle control systems according to some embodiments of the invention will be described with reference to the drawings.

Referring to FIG. 1 through FIG. 9, a vehicle control system according to a first embodiment of the invention will be described.

Figure 1:
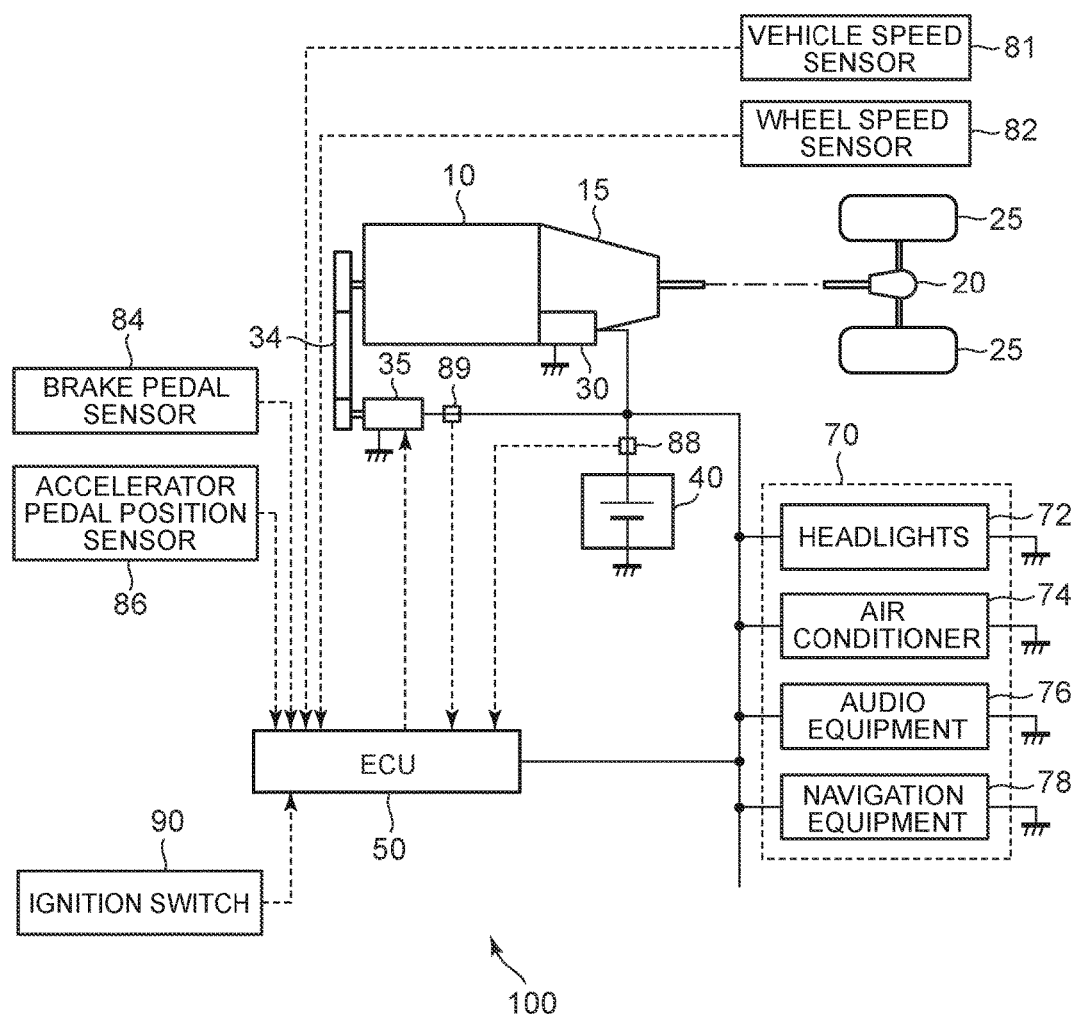
FIG. 1 is a schematic view showing the configuration of a vehicle according to a first embodiment of the invention.

The configuration of a vehicle according to this embodiment will be described with reference to FIG. 1. FIG. 1 schematically shows the configuration of the vehicle according to the first embodiment.

In FIG. 1, the vehicle 100 includes an engine 10, an automatic transmission 15, a differential gear unit 20, drive wheels 25, a starter 30, an alternator 35, a battery 40, and an ECU (Electronic Control Unit) 50. In particular, the vehicle 100 has an idling stop function for the engine 10.

The engine 10 is an internal combustion engine that generates power by burning a fuel, such as gasoline. The power of the engine 10 is transmitted to the automatic transmission 15, and is also transmitted to the alternator 35 via a drive mechanism 34, such as a belt drive, for example. The output of the engine 10 is changed by an engine control computer (not shown), according to the amount of depression of an accelerator pedal (not shown) that is operated by the driver.

The automatic transmission 15 automatically performs change of the speed ratio (so-called shift change). The power (rotational speed and torque) of the engine 10 is changed by the automatic transmission 15, and is transmitted, as desired rotational speed and torque, to the right and left drive wheels 25, via the differential gear unit 20. Thus, the power of the engine 10 is transmitted to the drive wheels 25 via the automatic transmission 15, while being changed according to the amount of depression of the accelerator pedal. As a result, the vehicle 100 is accelerated and decelerated.

The alternator 35 generates electric power, using some of the power of the engine 10. The electric power generated by the alternator 35 is used, for example, for charging the battery 40, via an inverter (not shown).

For example, the battery 40 is a lead storage battery, or the like, which serves as a DC power supply with a voltage of 12 V (volts), and supplies electric power to peripheral devices provided other than the main body of the engine 10. In the following, a peripheral device that is provided other than the main body of the engine 10, and operates using electric power stored in the battery 40, will be called "accessory". A collection of accessories will be called "accessories".

As the accessories 70, the vehicle 100 includes headlights 72, an air conditioner 74, audio equipment 76, navigation equipment 78, and so forth. The air conditioner 74 has a compressor that compresses a refrigerant (air conditioner gas), a condenser that cools the compressed refrigerant, a receiver that temporarily stores the liquefied refrigerant, and an expansion valve that injects the refrigerant into a cool storage evaporator having a cool storage material. Some of the power of the engine 10 is transmitted to the compressor via the drive mechanism 34.

The starter 30 is a cell-motor that starts the engine 10 with electric power supplied from the battery 40. Normally, if the driver operates an ignition switch 90 so as to start operation of the vehicle 100 that has been stopped, the starter 30 is started, and the engine 10 is started. The starter 30 is also used for restarting the engine 10 from a condition where the engine 10 is stopped, under idling stop control.

The ECU 50 is configured as a computer including a CPU (Central Processing Unit) that executes computer programs, ROM (Read-Only Memory) that stores the computer programs, etc., RAM (Random Access Memory) that temporarily stores data, input and output ports connected to various sensors, actuators, etc., and so forth. In operation, electric power is supplied from the battery 40 to the ECU 50.

The sensors connected to the ECU 50 include a vehicle speed sensor 81 that detects the vehicle speed, a wheel speed sensor 82 that detect the rotational speed of the drive wheels 25, a brake pedal sensor 84 that detects depression of a brake pedal (not shown), an accelerator pedal position sensor 86 that detects the amount of depression of the accelerator pedal (not shown) as an accelerator pedal position or stroke, a battery current sensor 88 that detects charge/discharge current (battery current) of the battery 40, and an alternator current sensor 89 that detects output current (alternator current) of the alternator 35, for example. The actuators connected to the ECU 50 include the starter 30 and the alternator 35, for example.

The ECU 50 controls the starter 30 and the alternator 35, based on respective signals from various sensors, and the engine control computer (not shown), so as to control stop and restart of the engine (i.e., perform idling stop control), and also control the state of charge (SOC) of the battery 40. The SOC is defined as a value obtained by dividing the quantity of electricity remaining in the battery 40, by the quantity of electricity stored in the battery when it is fully charged.

Under the idling stop control, when the wheel speed detected by the wheel speed sensor 82 is reduced to be lower than a predetermined speed (e.g., 10 km/h), the ECU 50 determines that an engine stop condition is satisfied, and outputs a fuel-cut command to a fuel supply system. Then, when depression of the accelerator pedal is detected by the accelerator pedal position sensor 86, the ECU 50 determines that an engine restart condition is satisfied, and outputs an engine-restart command to the starter 30.

Figure 2:
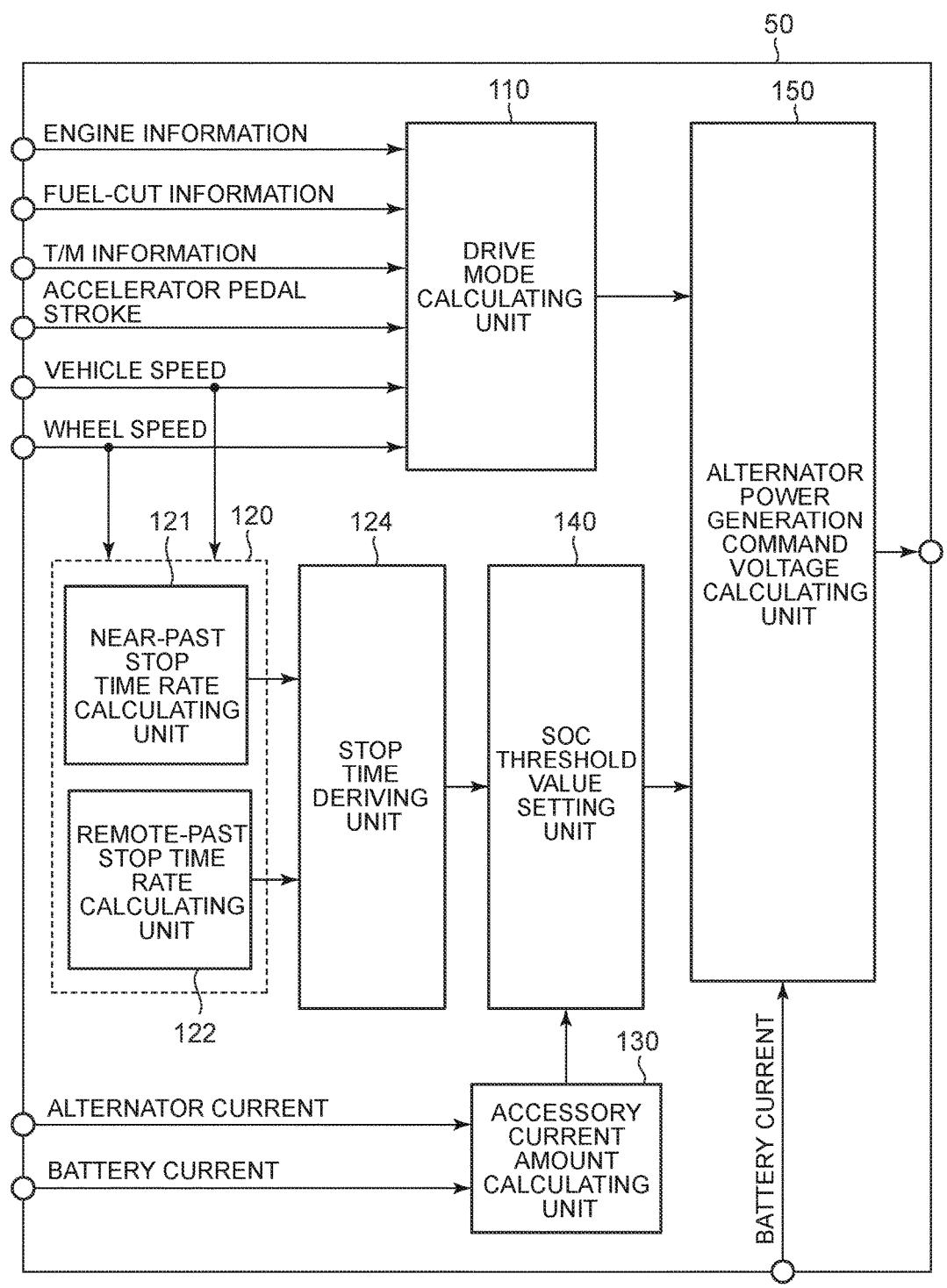
FIG. 2 is a view functionally showing a part of the configuration of an ECU according to the first embodiment of the invention.

Next, the configuration of the ECU 50 will be described with reference to FIG. 2. FIG. 2 functionally illustrates a part of the configuration of the ECU according to the first embodiment. FIG. 2 shows some functions of the ECU 50 for implementing control of the SOC of the battery 40.

In FIG. 2, the ECU 50 includes a drive mode calculating unit 110, a stop time rate calculating unit 120, a stop time deriving unit 124, an accessory current amount calculating unit 130, an SOC threshold value setting unit 140, and an alternator power-generation command voltage calculating unit 150. Each of the above-mentioned units 110-150 is a function implemented when the CPU included in the ECU 50 executes a computer program stored in the ROM.

The drive mode calculating unit 110 calculates a drive mode, based on engine information, such as the accelerator pedal stroke, sent from the engine control computer, and fuel-cut information indicating stoppage of fuel injection, transmission (T/M) information indicating the shift range of the automatic transmission 15, vehicle speed detected by the vehicle speed sensor 81, and the wheel speed detected by the wheel speed sensor 82.

Here, the "drive mode" indicates the traveling state of the vehicle 100, and may be selected from, for example, a constant-speed traveling mode, an acceleration traveling mode, and a deceleration traveling mode. The drive mode calculating unit 110 determines which of the above-indicated three types of traveling modes to which the current traveling state of the vehicle 100 corresponds, and transmits the driver mode thus determined to the alternator power-generation command voltage calculating unit 150

The stop time rate calculating unit 120 calculates the rate of the stop time in a predetermined period, based on the vehicle speed detected by the vehicle speed sensor 81 as an element of the traveling history of the vehicle, and the wheel speed detected by the wheel speed sensor 82. In this embodiment, the stop time rate calculating unit 120 has two units having different lengths of predetermined periods, namely, a near-past stop time rate calculating unit 121, and a remote-past stop time rate calculating unit 122.

The near-past stop time rate calculating unit 121 calculates the rate (which will be called "near-past stop time rate" when appropriate) of the stop time of the vehicle 100 in a relatively short period, like the past X minutes, for example. The remote-past stop time rate calculating unit 122 calculates the rate (which will be called "remote-past stop time rate" when appropriate) of the stop time of the vehicle 100 in a relatively long period, like the past Y minutes (Y>X), for example. In this embodiment, the following explanation is provided, assuming that X=10, and Y=15.

Referring to FIG. 3A and FIG. 3B, additional explanation will be provided with regard to a method of calculating the stop time rate. FIG. 3A and FIG. 3B are conceptual diagrams indicating the concept of calculation of the near-past stop time rate according to the first embodiment.

The near-past stop time rate calculating unit 121 starts a stop time obtaining routine for obtaining the stop time, using a point in time at which the vehicle speed of the vehicle 100 exceeds a predetermined speed (e.g., 15 km/h) as a starting point, after the engine 10 is started in response to operation of the ignition switch 90 by the driver.

More specifically, the near-past stop time rate calculating unit 121 has a storage stack ST1, as shown in FIG. 3A and FIG. 3B. The storage stack ST1 consists of ten stack elements M(1)-M(10). The near-past stop time rate calculating unit 121 obtains the stop time in 60 seconds, each time 60 seconds elapse, and sequentially stores the obtained results in the stack elements M(1)-M(10). The stack element in which the stop time is stored sequentially moves from M(1) toward M(10).

The stop time is obtained by determining whether the vehicle is stopped, based on the wheel speed detected by the wheel speed sensor 82, and measuring a length of time for which the vehicle is stopped, over the period of 60 seconds. Namely, the near-past stop time rate calculating unit 121 sequentially obtains the stop time in the period of 60 seconds, in cycles of 60 seconds, and sequentially stores the obtained stop time in one of the stack elements M(1)-M(10), in the order from the stack element M(1) to M(10).

More specifically, as shown in FIG. 3A, the near-past stop time rate calculating unit 121 stores 20 sec., as a stop time, in the stack element M(1) when 60 sec. elapses, stores 0 sec., as a stop time, in the stack element M(2) when 120 sec. elapses, and stores 60 sec., as a stop time, in the stack element M(3) when 180 sec. elapses.

When the stop times are stored down to the last stack element M(10), namely, when a total of 10 min. (600 sec.) elapses, as shown in FIG. 3B, a stop time pt obtained in the next cycle will be stored in the first stack element M(1). At this time, the values stored in the stack elements M(2)-M(10) so far are maintained. Then, a stop time (not shown) obtained in a cycle following the stop time pt will be stored in the second stack element M(2). In this manner, when the stop times are stored in all of the stack elements M(1)-M(10), the near-past stop time rate calculating unit 121 returns to the first stack element M(1) of the storage stack ST1, and sequentially updates the stop times.

The near-past stop time rate calculating unit 121 executes a stop time rate calculating routine, in addition to the above-described stop time obtaining routine. In the stop time rate calculating routine, the near-past stop time rate calculating unit 121 obtains a total value of the stop times stored in the respective stack elements M(1)-M(10) of the storage stack ST1, and obtains a near-past stop time rate R1, by dividing the obtained total value, by a length of time (600 sec.) required to fill all of the stack elements M(1)-M(10). The near-past stop time rate R1 is recalculated each time the stack element M is updated, namely, every 60 seconds.

The remote-past stop time rate calculating unit 122 also executes a stop time obtaining routine and a stop time rate calculating routine, so as to calculate a remote-past stop time rate R2, in the same manner as the above-described near-past stop time rate calculating unit 121. It is, however, to be noted that the remote-past stop time rate calculating unit 122 sequentially updates respective stack elements N(1)-N(10) (not shown) of a storage stack ST2 every 90 seconds. Namely, the remote-past stop time rate calculating unit 122 stores the stop time of the vehicle 100 in a period of 90 seconds, in each of the stack elements N(1)-N(10).

The remote-past stop time rate calculating unit 122 obtains a total value of the stop times stored in the respective stack elements N(1)-N(10) of the storage stack ST2, and obtains the remote-past stop time rate R2, by dividing the obtained total value, by a length of time (900 sec.) required to fill all of the stack elements N(1)-N(10). The remote-past stop time rate R2 is recalculated each time the stack element M is updated, namely, every 90 seconds.

The above-described calculation of the stop time rate is continuously carried out until the engine 10 is stopped when the driver operates the ignition switch 90 to the OFF position.

Referring back to FIG. 2, the stop time deriving unit 124 derives a stop time (which will be called "estimated stop time" when appropriate) that is estimated at the time when the vehicle stops next time, based on the near-past stop time rate R1 and remote-past stop time rate R2 derived by the stop time rate calculating unit 120.

More specifically, the stop time deriving unit 124 obtains a near-past stop time coefficient Tr1 and a remote-past stop time coefficient Tr2 corresponding to the near-past stop time rate R1 and the remote-past stop time rate R2, respectively, by referring to a map (see FIG. 4) that is prepared in advance. Then, the stop time deriving unit 124 employs the larger value of the near-past stop time coefficient Tr1 and the remote-past stop time coefficient Tr2, as the estimated stop time.

The accessory current amount calculating unit 130 calculates the amount of accessory current spent by the accessories 70, based on the alternator current detected by the alternator current sensor 89, and the battery current of the battery 40 detected by the battery current sensor 88.

The SOC threshold value setting unit 140 sets an SOC threshold value DP and an SOC target value TS (see FIG. 5) associated with SOC control of the battery 40, based on the estimated stop time and the accessory current amount.

The "SOC threshold value DP" is a value based on which it is determined whether the power-generation operating state of the alternator 35 is brought into a rapid-charge operating state for recovering the SOC of the battery 40. More specifically, when the SOC of the battery 40 is lower than the SOC threshold value DP, insufficiency of the quantity of electricity for idling stop is predicted when the vehicle stops next time. Thus, in this case, the power-generation operating state of the alternator 35 is brought into the rapid-charge operating state, and rapid-charge battery control is performed.

In the rapid-charge operating state, when the SOC of the battery 40 is at such a level that the battery 40 should be rapidly charged, and the drive mode of the vehicle 100 is the constant-speed traveling mode or the acceleration traveling mode, a power-generation command voltage indicating a voltage value for rapid charging is generated from an alternator power-generation command voltage calculating unit 150, so that the alternator 35 is controlled so as to generate constant-voltage electric power for rapid charging.

When the SOC target value TS is changed, the SOC threshold value DP is also changed according to the change of the SOC target value TS, such that a difference between the SOC threshold value DP and the SOC target value TS is kept at a predetermined value.

The alternator power-generation command voltage calculating unit 150 calculates a voltage value (power-generation command value) that represents the amount of electric power to be generated, as a command given to the alternator 35, based on the SOC threshold value DP and SOC target value TS set by the SOC threshold value setting unit 140, the drive mode calculated by the drive mode calculating unit 110, and the battery current detected by the battery current sensor 88.

More specifically, in order to make the SOC of the battery 40 close to the SOC target value TS or keep the SOC at the SOC target value TS while the vehicle 100 is traveling in the constant-speed traveling mode, under feedback control for controlling the voltage of electric power generated by the alternator 35, the alternator power-generation command voltage calculating unit 150 calculates the power-generation command voltage, based on a difference between the integrated value of the battery current (i.e., the charge/discharge current integrated value of the battery 40) detected by the battery current sensor 88, and a target value of the charge/discharge current integrated value corresponding to the SOC target value TS, for example. Namely, the power-generation command voltage is feedback-controlled so that the charge/discharge current integrated value becomes equal to the target value of the charge/discharge current integrated value. As a result, the SOC of the battery 40 is made close to or kept at the SOC target value TS. The above-described feedback control is a mere example, and the invention is not limited to this example.

Figures 4, 5:
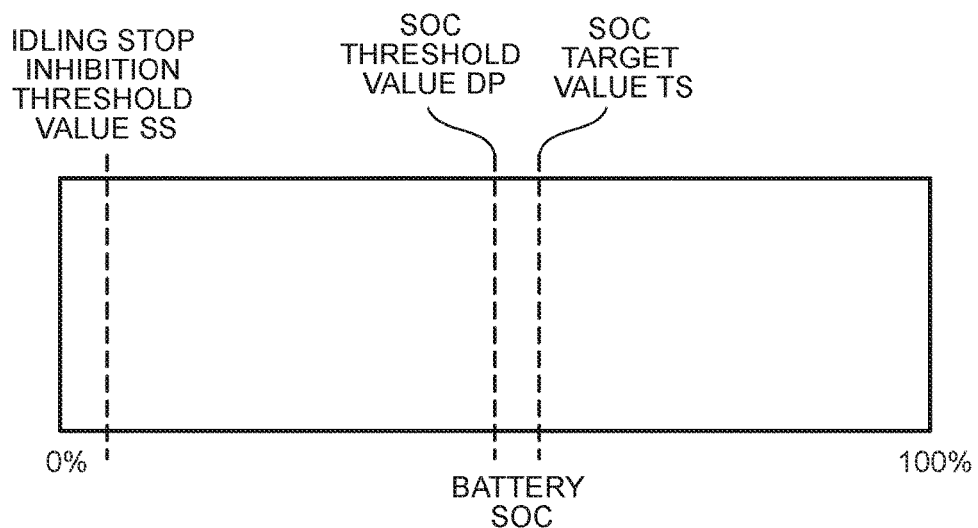
FIG. 4 is one example of a map indicating the relationship between the stop time rate and the stop time coefficient according to the first embodiment of the invention.
FIG. 5 is a view showing the concept of SOC control of a battery according to the first embodiment of the invention.

In FIG. 5, "idling stop inhibition threshold value SS" is a value based on which it is determined whether the idling stop control is stopped, and the engine is restarted.

Next, the SOC control of the battery 40 will be described. In particular, the SOC control performed when the air conditioner 74 is in operation will be described. The statement that "the air conditioner 74 is in operation" means that "A/C switch" (not shown) provided on the vehicle is in the ON state (namely, it is not limited to the time when the compressor of the air conditioner 74 is in operation).

As described above, some of the power of the engine 10 is transmitted to the compressor of the air conditioner 74, via the drive mechanism 34. Namely, it is necessary to operate the engine 10 so as to activate the compressor.

However, even when the A/C switch is ON, the compressor can be stopped (namely, the engine 10 can be stopped) if temporarily since increase of the in-vehicle temperature can be suppressed by cool air stored in the cool storage evaporator, for example. Namely, even when the A/C switch is ON, the idling stop control can be performed.

Figure 6:
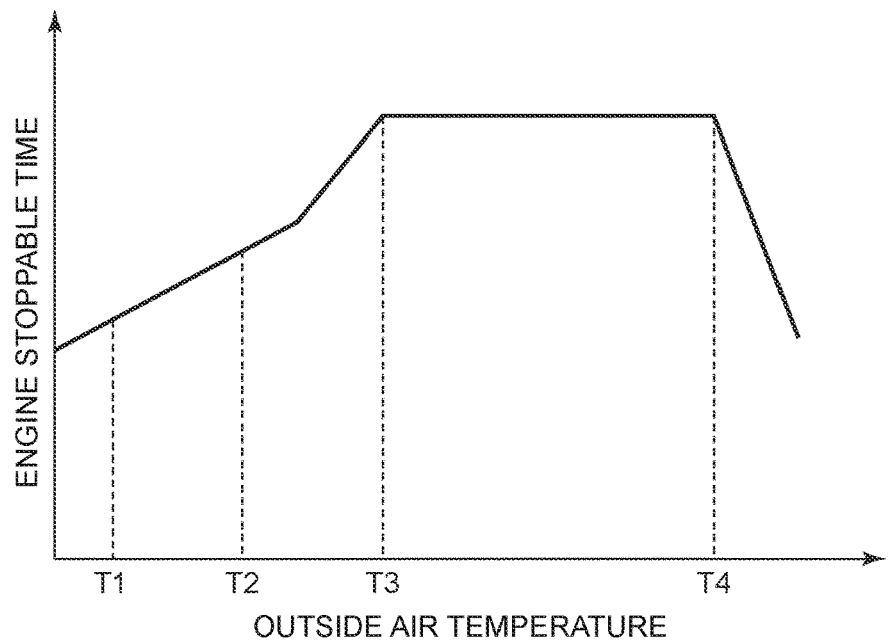
FIG. 6 is one example of a map indicating the relationship between the outside air temperature and the engine stoppable time.

In this connection, how long the compressor can be stopped, namely, how long the engine can be stopped, when the A/C switch is ON, depends on the outside air temperature, or a difference between the outside air temperature and the set temperature of the air conditioner 74, for example. More specifically, at temperatures at which one feels comfortable (e.g., at around 20° C.), the engine 10 can be stopped for the maximum time (namely, the compressor can be stopped for the maximum time), as shown in FIG. 6. As the outside air temperature becomes lower than the temperatures at which one feels comfortable, the length of time for which the engine 10 can be stopped is shortened. Similarly, as the outside air temperature becomes higher than the temperatures at which one feels comfortable, the length of time for which the engine 10 can be stopped is shortened. Also, as shown in FIG. 7, as the difference between the outside air temperature and the set temperature becomes larger, the length of time for which the engine 10 can be stopped is shortened.

When the outside air temperature is lower than the temperatures at which one feels comfortable, the outside air is once cooled by the cool storage evaporator, so that moisture in the outside air is reduced. Then, the outside air that has passed through the cool storage evaporator is guided into the interior of the vehicle 100 directly or via a heater core.

In FIG. 6, when the outside air temperature is equal to or higher than T4, the time for which the engine 10 can be stopped is shortened, or the engine 10 cannot be stopped, so as to give priority to comfort provided by cooling of the interior of the vehicle 100. When the outside air temperature is between T2 and T3, the time for which the engine 10 can be stopped is shortened, so as to prevent windows from being fogged up by moisture, for example. When the outside air temperature is between T1 and T2, the time for which the engine 10 can be stopped is further shortened, so as to prevent dew condensation due to moisture, for example. When the outside air temperature is equal to or lower than T1, the time for which the engine 10 can be stopped is further shortened, so as to give priority to comfort provided by heating of the interior of the vehicle 100.

Figure 7:
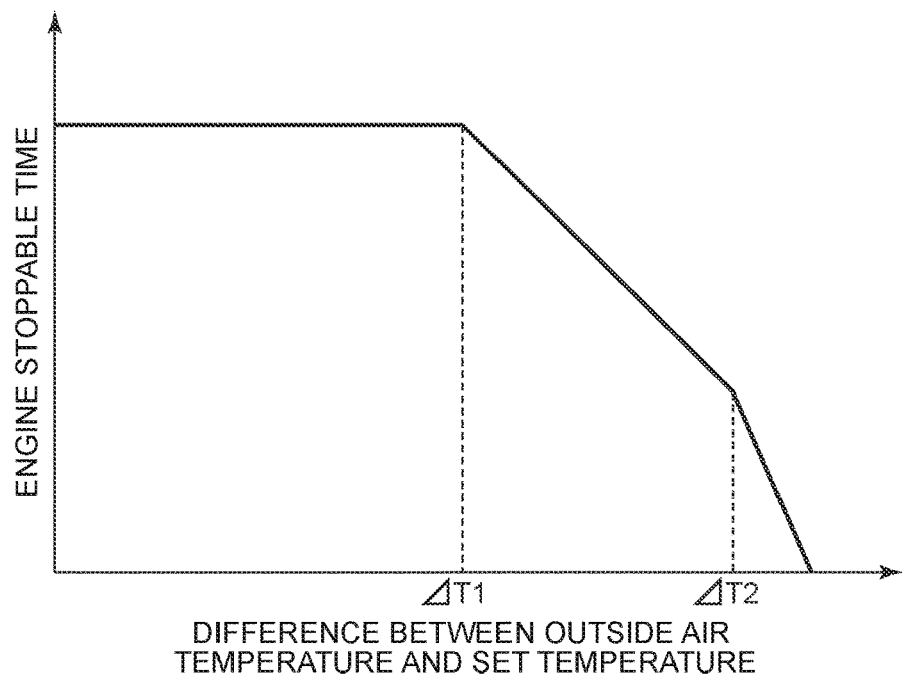
FIG. 7 is one example of a map indicating the relationship between a difference between the outside air temperature and the set temperature, and the engine stoppable time.

In FIG. 7, when the temperature difference is between $\Delta T1$ and $\Delta T2$, the time for which the engine 10 can be stopped is shortened, so as to prevent fogging of windows or smell due to moisture, for example, namely, to give priority to dehumidification. When the temperature difference is equal to or larger than $\Delta T2$, the time for which the engine 10 can be stopped is further shortened, or the engine 10 cannot be stopped, so as to give priority to comfort in the interior of the vehicle 100.

The outside air temperatures T1-T4 in FIG. 6, $\Delta T1$ and $\Delta T2$ in FIG. 7, and the length of time for which the engine is stopped may be set as appropriate, according to the specifications (in particular, the performance of the cool storage evaporator) of the vehicle to which this invention is applied.

In the meantime, under idling stop control, the quantity of electricity consumed during stopping of the engine 10 is often estimated based on the above-described estimated stop time. However, when the A/C switch is ON, the length of time for which the engine 10 can be stopped is limited, as described above. Since the engine 10 is sometimes started earlier than the estimated stop time, the SOC of the battery 40 may become excessively large, and the fuel economy may deteriorate, for example, if an attempt to secure the quantity of electricity estimated based on the estimated stop time is made so as to perform the idling stop control.

In this embodiment, regarding the idling stop control, conditions caused by operation of the air conditioner 74 will be called "A/C requirements". Also, regarding the idling stop control, conditions that focus on only the balance (supply and consumption) of electric power of the battery 40 will be called "power-supply requirements".

The A/C requirements include (i) the engine stoppable time determined from the map shown in FIG. 6 and the outside air temperature, or determined from the map shown in FIG. 7, and a temperature difference between the outside air temperature and the set temperature of the air conditioner 74, and (ii) the quantity of electricity consumed during stopping of the engine 10, which quantity is estimated based on the engine stoppable time. Here, the engine stoppable time may be obtained, using either the map shown in FIG.

6 or the map shown in FIG. 7. Various known methods may be employed as a method of detecting the outside air temperature, and a method of detecting the temperature difference between the outside air temperature and the set temperature of the air conditioner 74, and therefore, these methods will not be described in detail.

The power-supply requirements are always established irrespective of whether the air conditioner 74 is in operation, but the A/C requirements are established only when the air conditioner 74 is in operation (namely, when the A/C switch is ON).

In this embodiment, the quantity of electricity associated with the power-supply requirements is compared with the quantity of electricity associated with the A/C requirements, and the SOC target value TS (see FIG. 5) for use in the SOC control of the battery 40 is determined, according to the result of the comparison.

The quantity of electricity associated with the A/C requirements is expressed as the product of the engine stoppable time determined from the outside air temperature or the temperature difference, and the current accessory load (namely, a total load of the accessories that are currently in operation). The electric quantity associated with the A/C requirements will be called "electric quantity Q1" or "A/C requirement (Q1)".

The quantity of electricity associated with the power-supply requirements is expressed as the product of the estimated stop time and the current accessory load. The electric quantity associated with the power-supply requirements when the A/C switch is ON will be called "electric quantity Q2" or "power-supply requirement (Q2)". The electric quantity associated with the power-supply requirements when the A/C switch is OFF will be called "electric quantity Q3" or "power-supply requirement (Q3)".

When the above-indicated electric quantities Q1, Q2 and Q3 are obtained, the accessory current amount calculated by the accessory current amount calculating unit 130 (see FIG. 2), for example, may be used as the "current accessory load".

Figure 8A:
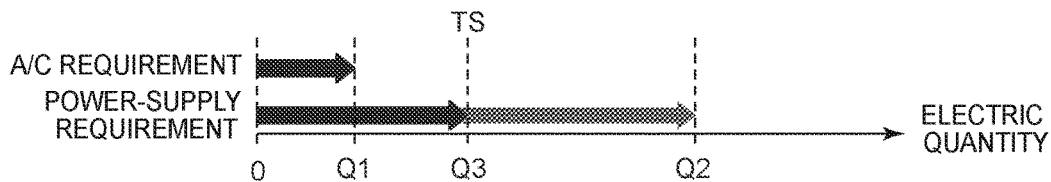
FIG. 8A is a view showing one example of comparison between an electric quantity of a power-supply requirement and an electric quantity of an A/C requirement.
Figure 8B:
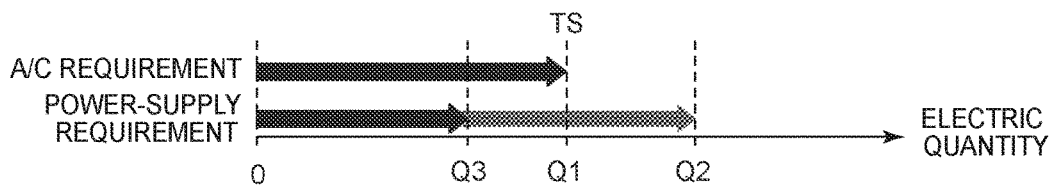
FIG. 8B is a view showing one example of comparison between the electric quantity of the power-supply requirement and the electric quantity of the A/C requirement.
Figure 8C:
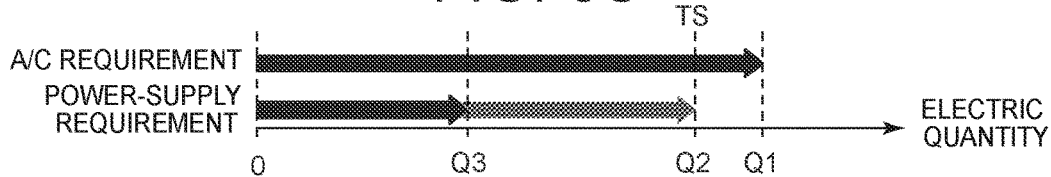
FIG. 8C is a view showing one example of comparison between the electric quantity of the power-supply requirement and the electric quantity of the A/C requirement.

Next, the method of determining the SOC target value TS will be described in detail, with reference to FIG. 8A, FIG. 8B, and FIG. 8C. In FIG. 8A, FIG. 8B, and FIG. 8C, "0" corresponds to the "idling stop inhibition threshold value SS" in FIG. 5. FIG. 8A indicates the case where "electric quantity Q1<electric quantity Q3<electric quantity Q2". FIG. 8B indicates the case where "electric quantity Q3<electric quantity Q1<electric quantity Q2". FIG. 8C indicates the case where "electric quantity Q3<electric quantity Q2<electric quantity Q1".

In the case shown in FIG. 8A, since the engine stoppable time determined from the map shown in FIG. 6 or FIG. 7 is shorter than the estimated stop time, the length of time for which the engine 10 can be stopped under idling stop control is the engine stoppable time determined from the map shown in FIG. 6 or FIG. 7. Therefore, if only the electric quantity Q1 is simply secured, the SOC of the battery 40 is prevented from falling below the idling stop inhibition threshold value SS (namely, "0" in FIG. 8A), during stopping of the engine 10 under idling stop control.

However, if the drive switches the A/C switch from ON to OFF during stopping of the vehicle, for example, it becomes unnecessary to activate the compressor, and therefore, the time for which the engine 10 can be stopped is prolonged. In this case, if only the electric quantity Q1 is secured, the SOC of the battery 40 may fall below the idling stop inhibition threshold value SS, during stopping of the engine 10 under idling stop control.

Thus, in the case shown in FIG. 8A, the SOC target value TS is determined so as to secure the electric quantity Q3 as the product of the estimated stop time, and the load when the A/C switch is OFF (namely, a value obtained by subtracting the load of the air conditioner 74 from the current accessory load). In this case, the SOC target value TS is equal to the "idling stop inhibition threshold value SS+SOC value corresponding to the electric quantity Q3". With this arrangement, it is possible to appropriate perform idling stop control even when the A/C switch is turned OFF, while preventing the SOC of the battery 40 from being excessively large.

In the case shown in FIG. 8B, since the engine stoppable time determined from the map shown in FIG. 6 or FIG. 7 is shorter than the estimated stop time, the time for which the engine 10 can be stopped under idling stop control is equal to the engine stoppable time determined from the map shown in FIG. 6 or FIG. 7.

In the case shown in FIG. 8B, the electric quantity Q1 is larger than the electric quantity Q3; therefore, even if the A/C switch is turned OFF during stopping of the vehicle, the SOC of the battery 40 can be prevented from falling below the idling stop inhibition threshold value SS, during stopping of the engine 10 under idling stop control, provided that only the electric quantity Q1 is secured. Accordingly, in the case shown in FIG. 8B, the SOC target value TS is determined so as to secure the electric quantity Q1. In this case, the SOC target value TS is equal to the "idling stop inhibition threshold value SS+SOC value corresponding to the electric quantity Q1".

In the case shown in FIG. 8C, since the estimated stop time is shorter than the engine stoppable time determined from the map shown in FIG. 6 or FIG. 7, the time for which the engine 10 can be stopped under idling stop control is equal to the estimated stop time.

In the case shown in FIG. 8C, if only the electric quantity Q2 is secured, the SOC of the battery 40 can be prevented from falling below the idling stop inhibition threshold value SS, during stopping of the engine 10 under idling stop control. Accordingly, in the case shown in FIG. 8C, the SOC target value TS is determined so as to secure the electric quantity Q2. In this case, the SOC target value TS is equal to the "idling stop inhibition threshold value SS+SOC value corresponding to the electric quantity Q2".

Next, a control routine for the battery 40, which is executed by the ECU 50, will be described with reference to the flowchart of FIG. 9.

Figure 9:
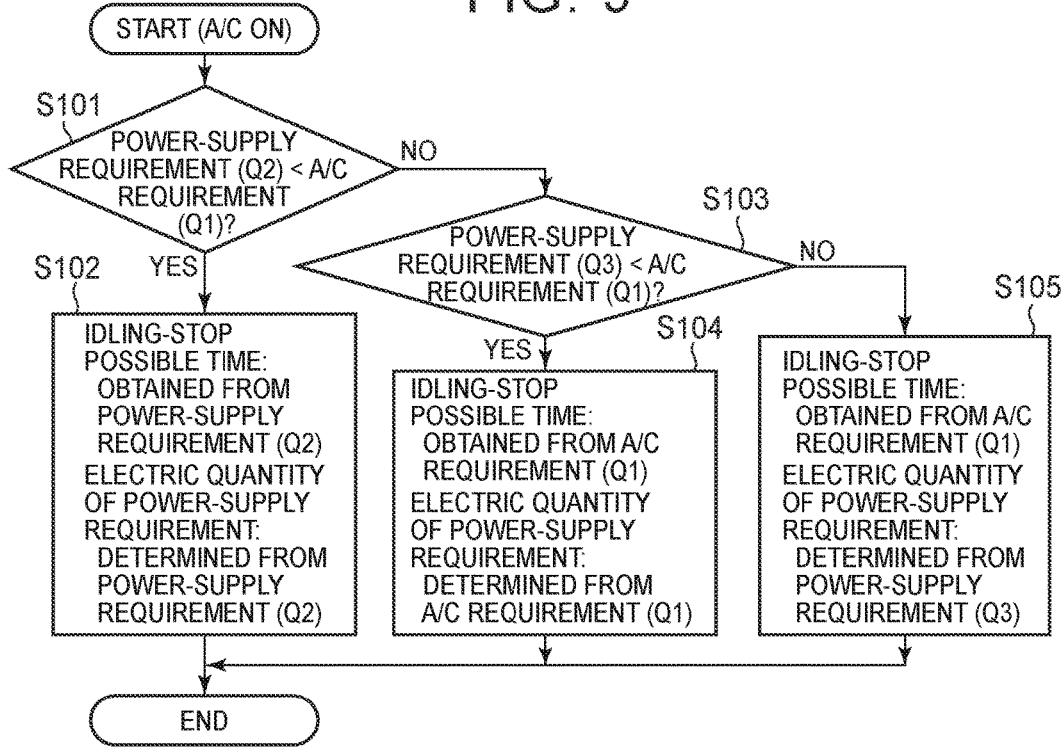
FIG. 9 is a flowchart illustrating a control routine for the battery according to the first embodiment of the invention.

In FIG. 9, when the A/C switch is ON, the ECU 50 determines whether the power-supply requirement (Q2) is smaller than the A/C requirement (Q1) (step S101). If it is determined that the power-supply requirement (Q2) is smaller than the A/C requirement (Q1) (step S101: YES) (namely, in the case of FIG. 8C), the ECU 50 sets the time for which the engine 10 can be stopped under idling stop control to the estimated stop time, and determines the SOC target value TS from the power-supply requirement (Q2) (step S102).

If it is determined in step S101 that the power-supply requirement (Q2) is larger than the A/C requirement (Q1) (step S101: NO), the ECU 50 determines whether the power-supply requirement (Q3) is smaller than the A/C requirement (Q1) (step S103).

If it is determined that the power-supply requirement (Q3) is smaller than the A/C requirement (Q1) (step S103: YES) (namely, in the case of FIG. 8B), the ECU 50 sets the time for which the engine 10 can be stopped under idling stop control, to the engine stoppable time determined from the map shown in FIG. 6 or FIG. 7, and determines the SOC target value TS from the A/C requirement (Q1) (step S104).

If it is determined in step S103 that the power-supply requirement (Q3) is larger than the A/C requirement (Q1) (step S103: NO) (namely, in the case of FIG. 8A), the ECU 50 sets the time for which the engine 10 can be stopped under idling stop control, to the engine stoppable time determined from the map shown in FIG. 6 or FIG. 7, and determines the SOC target value TS from the power-supply requirement (Q3) (step S105).

The ECU 50 performs battery control, such as known rapid charge or normal charge, according to the SOC of the battery 40, based on the SOC target value TS, etc. determined according to the above-described control routine. During normal charge, in particular, the ECU 50 performs battery control through feedback power generation control based on the SOC target value TS.

The "accessories 70" according to the first embodiment is one embodiment of the "plurality of accessories" according to the invention. The "ECU 50" according to the first embodiment is one example of the "first calculating means", "second calculating means", "setting means" and "vehicle control system" according to the invention. The "idling stop inhibition threshold value SS", "SOC target value TS", "engine stoppable time", "estimated stop time", "electric quantity Q1" and "electric quantity Q2" according to the first embodiment are respective examples of the "SOC threshold value", "SOC target value", "first stop time", "second stop time", "first electric quantity" and "second electric quantity" according to the invention.

The "idling stop inhibition threshold value SS+SOC value corresponding to the electric quantity Q1" and the "idling stop inhibition threshold value SS+SOC value corresponding to the electric quantity Q2" according to the first embodiment are respective examples of the "first SOC value" and "second SOC value" according to the invention. The "idling stop inhibition threshold value SS+SOC value corresponding to the electric quantity Q1" and "idling stop inhibition threshold value SS+SOC value corresponding to the electric quantity Q3" according to the first embodiment correspond to examples of the "third SOC value" according to the invention.

A vehicle control system according to a second embodiment of the invention will be described with reference to FIG. 10A through FIG. 12. The second embodiment is identical with the above-described first embodiment, except that a part of the method of calculating the quantity of electricity to be secured at the time of idling stop is different. Accordingly, description of the second embodiment, which overlaps that of the first embodiment, will be omitted, and the same reference numerals are assigned to common portions or elements on the drawings, while only basically different points will be described with reference to FIG. 10A through FIG. 12.

While the vehicle 100 is traveling, namely, while the engine 10 is in operation, the alternator 35 generates electric power, using the power of the engine 10, so as to charge the battery 40, and the compressor operates with the power of the engine 10, so that cool air is stored in the cool storage evaporator of the air conditioner 74.

When the vehicle 100 is traveling in an urban area, for example, the vehicle 100 may stop relatively frequently. Namely, the traveling time of the vehicle 100 becomes relatively short, and the SOC of the battery 40 may not be sufficiently recovered. Similarly, the cool storage status of the cool storage evaporator may not be sufficient.

When the SOC of the battery 40 is not sufficiently recovered, the maximum time for which the engine 10 can be stopped under idling stop control is determined by the current SOC of the battery 40. Similarly, when the cool storage status of the cool storage evaporator is not sufficient, the time for which the compressor can be stopped (namely, the time for which the engine 10 can be stopped) is not determined by the outside air temperature (see FIG. 6) or the temperature difference (see FIG. 7), but determined by the current cool storage status of the cool storage evaporator.

In the meantime, the amount of charge (namely, the SOC recovery performance) of the battery 40 greatly depends on traveling conditions of the vehicle 100, whereas the cool storage status of the cool storage evaporator hardly depends on the traveling conditions of the vehicle 100. Accordingly, the SOC recovery performance of the battery 40 and the cool-storage recovery performance of the cool storage evaporator often differ from each other, depending on the traveling conditions of the vehicle 100.

More specifically, when the cool-storage recovery performance of the cool storage evaporator (see the "A/C requirement" in FIG. 10A) exceeds the SOC recovery performance of the battery 40 (see the "power-supply requirement" in FIG. 10A), as shown in FIG. 10A, for example, the time for which the compressor can be stopped according to the cool storage status of the cool storage evaporator (namely, the time for which the engine 10 can be stopped) is longer than the time for which the engine 10 can be stopped according to the current SOC of the battery 40.

However, there is an upper limit according to the cool storage performance of the cool storage evaporator, to the time for which the compressor can be stopped according to the cool storage status of the cool storage evaporator (see "IDLING-STOP MAXIMUM TIME UNDER A/C REQUIREMENT" in FIG. 10A). Therefore, if the traveling time is relatively long, the time for which the engine 10 can be stopped according to the current SOC of the battery 40 exceeds the time for which the compressor can be stopped according to the cool storage status of the cool storage evaporator (see the graph of FIG. 10A at and after "traveling time T").

The "IDLING-STOP MAXIMUM TIME UNDER A/C REQUIREMENT" typically depends on the current outside air temperature, or a temperature difference between the current outside air temperature and the set temperature (more specifically, it is determined from the current outside air temperature and the map shown in FIG. 6, or the current temperature difference and the map shown in FIG. 7, for example).

On the other hand, when the SOC recovery performance of the battery 40 exceeds the cool-storage recovery performance of the cool storage evaporator, as shown in FIG. 10B, the time for which the engine 10 can be stopped according to the current SOC of the battery 40 is always longer than the time for which the compressor can be stopped according to the cool storage status of the cool storage evaporator.

When the cool-storage recovery performance of the cool storage evaporator exceeds the SOC recovery performance of the battery 40, and the traveling time is shorter than the traveling time T in FIG. 10A, the following technical problem may arise.

As shown in FIG. 11A (A/C requirement and power-supply requirement a "BEFORE FIRST IDLING STOP"), it is assumed that the SOC target value TS is determined from the A/C requirement (Q1) (corresponding to step S104 of FIG. 9 as described above), before the first idling stop control is executed. Then, the SOC of the battery 40 is assumed to be a value (see "Q1" in FIG. 11A) that is larger by an SOC value corresponding to the electric quantity Q1 than the idling stop inhibition threshold value SS (see FIG. 5) (see "POWER-SUPPLY REQUIREMENT a" in FIG. 11A).

As shown in FIG. 11B, after the first idling stop control is executed, and before the second idling stop control is executed, the cool-storage recovery performance of the cool storage evaporator exceeds the SOC recovery performance of the battery 40. Therefore, the product of the time for which the compressor can be stopped and the current accessory load (see "A/C REQUIREMENT" in FIG. 11B) becomes larger than the product of the time for which the engine 10 can be stopped according to the current SOC and the current accessory load (see "POWER-SUPPLY REQUIREMENT a" in FIG. 11B).

Thus, the time for which the compressor can be stopped becomes longer than the time for which the engine 10 can be stopped according to the current SOC. Namely, the time for which the compressor can be stopped is shortened, by a length of time corresponding to a difference between the cool-storage recovery performance of the cool storage evaporator and the SOC recovery performance of the battery 40. Further, in the case of the power-supply requirement a in FIG. 11C, the SOC of the battery 40 becomes smaller than the idling stop inhibition threshold value SS, and the idling stop control is inhibited.

Thus, when the time for which the compressor can be stopped is longer than the time for which the engine 10 can be stopped according to the current SOC, the engine 10 is restarted, or the engine 10 is inhibited from being stopped, even though the compressor can be stopped, and the effect of suppressing or reducing the fuel consumption may be reduced.

Thus, in this embodiment, when the cool-storage recovery performance of the cool storage evaporator exceeds the SOC recovery performance of the battery 40, and the traveling time is shorter than the traveling time T in FIG. 10A, the SOC target value TS is set to a value (see "Q4" in FIG. 11A) that is larger than the idling stop inhibition threshold value SS by an SOC value corresponding to an electric quantity Q4 (see "POWER-SUPPLY REQUIREMENT b" in FIG. 11A).

With the above arrangement, a margin corresponding to a difference between the electric quantity Q4 and the electric quantity Q1 in FIG. 11A appears. Therefore, even when the cool-storage recovery performance of the cool storage evaporator exceeds the SOC recovery performance of the battery 40, the engine 10 can be stopped for the length of time for which the compressor can be stopped according to the cool storage status of the cool storage evaporator, or the idling stop control is less likely or unlikely to be inhibited.

The electric quantity Q4 may be set empirically or by simulation, by obtaining a quantity of electricity with which idling stop control can be appropriately performed, when the vehicle stops two or more times in a given period, for example. The vehicle 100 may be installed with a learning function of learning the electric quantity Q4, and the electric quantity Q4 may be set according to the result of the learning.

Figure 12:
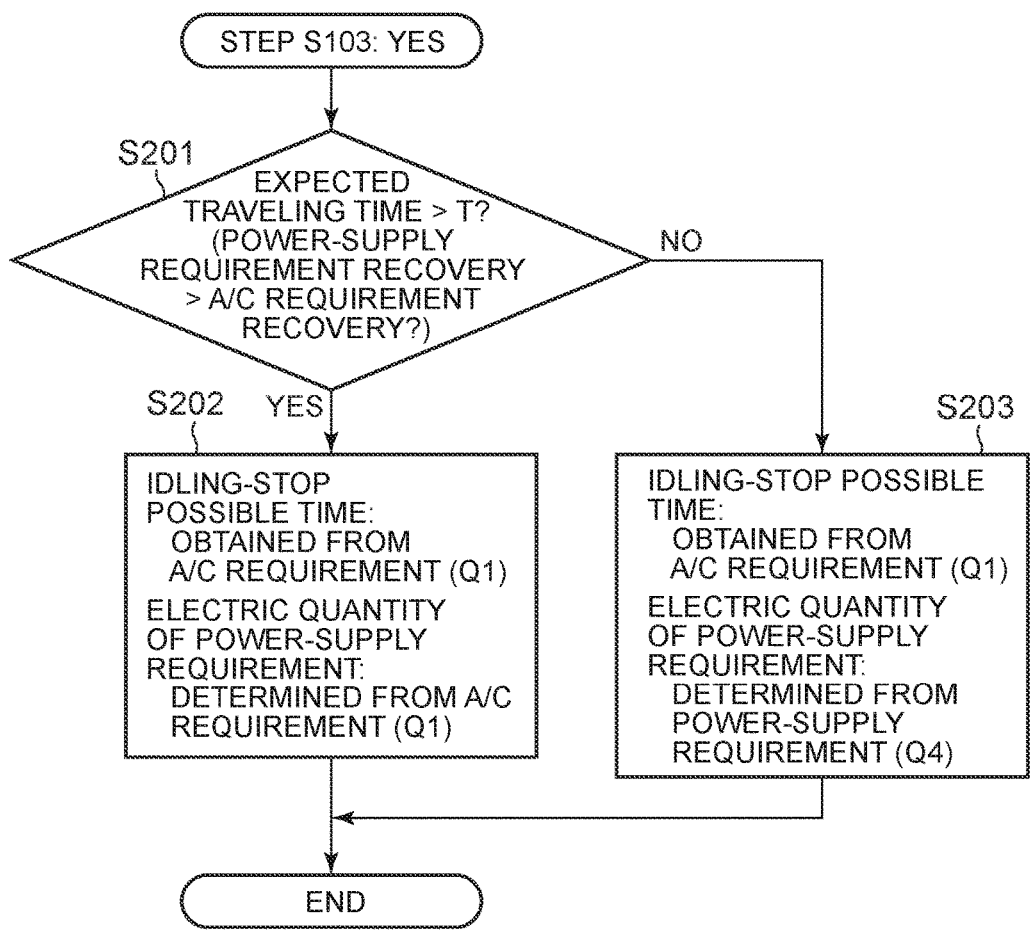
FIG. 12 is a flowchart illustrating a control routine for a battery according to a second embodiment of the invention.

Next, a control routine for the battery 40, which is executed by the ECU 50, will be described with reference to the flowchart of FIG. 12.

When it is determined, in step S103 of FIG. 9, that the power-supply requirement (Q3) is smaller than the A/C requirement (Q1) (step S103: YES), the ECU 50 determines whether an expected traveling time is longer than a predetermined time T (corresponding to "T" in FIG. 10A) (step S201).

Here, the "expected traveling time" is calculated based on the stop time immediately before this routine is executed, and the stop time rate calculated by the stop time rate calculating unit 120 (see FIG. 2) (specifically, the larger value of the near-past stop time rate R1 and the remote-past stop time rate R2). More specifically, the expected traveling time is expressed as follows.

Expected Traveling Time=Stop Time×(100−Stop Time Rate)/(Stop Time Rate)

If it is determined that the expected traveling time is longer than the predetermined time T (step S201: YES), the ECU 50 sets the time for which the engine 10 can be stopped under idling stop control, to the engine stoppable time determined from the map shown in FIG. 6 or FIG. 7, and determines the SOC target value TS from the A/C requirement (Q1) (step S202).

On the other hand, if it is determined that the expected traveling time is equal to or shorter than the predetermined time T (step S201: NO), the ECU 50 sets the time for which the engine 10 can be stopped under idling stop control, to the engine stoppable time determined from the map shown in FIG. 6 or FIG. 7, and determines the SOC target value TS from the power-supply requirement (Q4) (step S203).

The "predetermined time T" according to the second embodiment is one example of the "time threshold value" according to the invention. The "value that is larger by the SOC value corresponding to the electric quantity Q4 than the idling stop inhibition threshold value SS" according to the second embodiment is one example of the "fourth SOC value" according to the invention.

What is claimed is:

1. A control system of a vehicle comprising:
an engine;
a plurality of accessories including an air conditioner;
a battery supplying electric power to each of the plurality of accessories,
a generator generating electric power and charging the battery with at least some of the electric power; and
an ECU configured to
automatically stop the engine,
control the generator to charge or discharge the battery, so as to make an SOC of the battery close to an SOC target value,
inhibit the engine from being automatically stopped when the SOC of the battery is equal to or smaller than an SOC threshold value,
calculate a first stop time as a length of time for which the engine can be automatically stopped, during operation of the air conditioner, based on an outside air temperature, or a temperature difference between the outside air temperature and a set temperature of the air conditioner, wherein the first stop time is a length of time for which a compressor of the air conditioner can be stopped,
calculate a first electric quantity as an estimated quantity of electricity consumed, which quantity is determined by a product of the first stop time, and a total load of a set of operating accessories that are currently in operation, out of the plurality of accessories,
calculate a second stop time as a length of time for which the vehicle is predicted to be stopped in the future, from a traveling history of the vehicle, calculate a second electric quantity as an estimated quantity of electricity consumed, which quantity is determined by a product of the second stop time and the total load of the set of operating accessories,
determine the SOC target value, based on the first electric quantity and the second electric quantity, and
set the SOC target value to one of a first SOC and a third SOC value when the first electric quantity is smaller than the second electric quantity,
the third SOC value being equal to or larger than the first SOC value, and being smaller than a second SOC value, the first SOC value being larger than the SOC threshold value by an SOC value corresponding to the first electric quantity, the second SOC value being larger than the SOC threshold value by an SOC value corresponding to the second electric quantity.

2. The control system according to claim 1, wherein the ECU is configured to set the SOC target value to the third SOC value when the first electric quantity is smaller than the second electric quantity, the third SOC value being equal to or larger than a first SOC value, and being smaller than a second SOC value, the first SOC value being larger than the SOC threshold value by an SOC value corresponding to the first electric quantity, the second SOC value being larger than the SOC threshold value by an SOC value corresponding to the second electric quantity.

3. The control system according to claim 2, wherein the ECU is configured to set, when the first electric quantity is smaller than the second electric quantity, and an expected traveling time of the vehicle corresponding to the second stop time is shorter than a time threshold value, the SOC target value to a fourth SOC value that is smaller than the second SOC value, and is larger than the third SOC value.

4. The control system according to claim 2, wherein:
the set of operating accessories include the air conditioner as an operating accessory; and
the ECU is configured to
calculate a third electric quantity as an estimated quantity of electricity consumed, which quantity is determined by a product of a load obtained by subtracting a load of the air conditioner from the total load of the set of operating accessories, and the second stop time,
set the SOC target value to a fifth SOC value that is larger than the SOC threshold value by an SOC value corresponding to the third electric quantity when the first electric quantity is smaller than the third electric quantity, and
set the SOC target value to the first SOC value when the first electric quantity is equal to or larger than the third electric quantity.

5. A control system of a vehicle comprising:
an engine;
a plurality of accessories including an air conditioner;
a battery configured to supply electric power to each of the plurality of accessories;
a generator configured to generate electric power and charge the battery with at least some of the electric power; and
an electronic control unit (ECU) configured to
automatically stop the engine;
control the generator to charge or discharge the battery, so as to make a state of charge (SOC) of the battery close to an SOC target value;
inhibit the engine from being automatically stopped based on the SOC of the battery being equal to or less than an SOC threshold value;
calculate a first stop time as a length of time for which the engine can be automatically stopped, during operation of the air conditioner, based on an outside air temperature, or a temperature difference between the outside air temperature and a set temperature of the air conditioner;
calculate a first electric quantity as an estimated quantity of electricity consumed, which quantity is determined by a product of the first stop time, and a total load of a set of operating accessories that are currently in operation, out of the plurality of accessories;
calculate a second stop time as a length of time for which the vehicle is predicted to be stopped in the future, from a traveling history of the vehicle;
calculate a second electric quantity as an estimated quantity of electricity consumed, which quantity is determined by a product of the second stop time and the total load of the set of operating accessories;
determine a first SOC value based on the first electric quantity, and a second SOC value based on the second electric quantity; and
set the SOC target value, wherein:
the ECU is configured to set the SOC target value to one of the first SOC value or a third SOC value based on determining that the first SOC value is less than the second SOC value, and
the ECU is configured to set the SOC target value to the second SOC value based on determining that the first SOC value is greater than the second SOC value.

6. The control system according to claim 5, wherein:
the ECU is configured to set the SOC target value to the third SOC value based on determining that the first electric quantity is less than the second electric quantity, the third SOC value being equal to or greater than the first SOC value, and being less than the second SOC value, the first SOC value being greater than the SOC threshold value by an SOC value corresponding to the first electric quantity, the second SOC value being larger than the SOC threshold value by an SOC value corresponding to the second electric quantity.

7. The control system according to claim 6, wherein:
the ECU is configured to set, based on determining that the first electric quantity is less than the second electric quantity, and an expected traveling time of the vehicle corresponding to the second stop time is less than a time threshold value, the SOC target value to a fourth SOC value that is less than the second SOC value, and is greater than the third SOC value.

8. The control system according to claim 5, wherein:
the first stop time is a length of time for which a compressor of the air conditioner can be stopped.

9. The control system according to claim 6, wherein:
the set of operating accessories includes the air conditioner as an operating accessory; and
the ECU is configured to:
calculate a third electric quantity as an estimated quantity of electricity consumed, which quantity is determined by a product of a load obtained by subtracting a load of the air conditioner from the total load of the set of operating accessories, and the second stop time;

set the SOC target value to a fifth SOC value that is greater than the SOC threshold value by an SOC value corresponding to the third electric quantity based on determining the first electric quantity is less than the third electric quantity, and
set the SOC target value to the first SOC value based on determining that the first electric quantity is equal to or greater than the third electric quantity.

\* \* \* \* \*